United States Patent [19]

Markovs

[11] Patent Number: 5,223,145
[45] Date of Patent: Jun. 29, 1993

[54] REMOVAL OF MERCURY FROM PROCESS STREAMS

[75] Inventor: John Markovs, Yorktown Heights, N.Y.

[73] Assignee: UOP, Des Plaines, Ill.

[21] Appl. No.: 959,234

[22] Filed: Oct. 9, 1992

[51] Int. Cl.⁵ .................... B01D 15/00; B01D 53/04
[52] U.S. Cl. .................... 210/673; 210/678; 210/679; 210/688; 210/689; 210/914; 55/72; 55/74; 55/75; 55/31; 423/107; 423/210
[58] Field of Search .............. 423/107, 210; 55/72, 55/74, 75, 31; 210/673, 678, 679, 688, 689, 914; 208/253

[56] References Cited

U.S. PATENT DOCUMENTS

| | | | |
|---|---|---|---|
| 3,193,987 | 7/1965 | Manes et al. | 55/72 |
| 3,257,776 | 6/1966 | Park et al. | 55/72 |
| 3,755,989 | 9/1973 | Fornoff et al. | 55/72 |
| 4,101,631 | 7/1978 | Ambrosini et al. | 423/210 |
| 4,196,173 | 4/1980 | de Jong et al. | 423/210 |
| 4,500,327 | 2/1985 | Nishino | 55/72 |
| 4,874,525 | 10/1989 | Markovs | 210/673 |
| 4,892,567 | 1/1990 | Yan | 55/33 |
| 5,080,799 | 1/1992 | Yan | 55/72 |

OTHER PUBLICATIONS

Barrer et al, J. Chem. Soc. (1967) pp. 19-25.

Primary Examiner—Stanley S. Silverman
Assistant Examiner—Cynthia L. Nessler
Attorney, Agent, or Firm—Thomas K. McBride; Richard G. Miller

[57] ABSTRACT

Mercury is often removed as an impurity from process fluid streams by adsorption in fixed beds using any of several well-known adsorbents having the ability to selectively adsorb mercury. It is also common to reintroduce this sequestered mercury into the environment by means of the spent gas used to periodically regenerate the fixed beds. A solution to this problem is provided by the present invention in which the mercury is removed from the process stream using a large non-regenerated adsorption bed in combination with a periodically regenerated secondary adsorption bed, the mercury content of the latter being transferred to the former during the regeneration procedure.

11 Claims, 1 Drawing Sheet

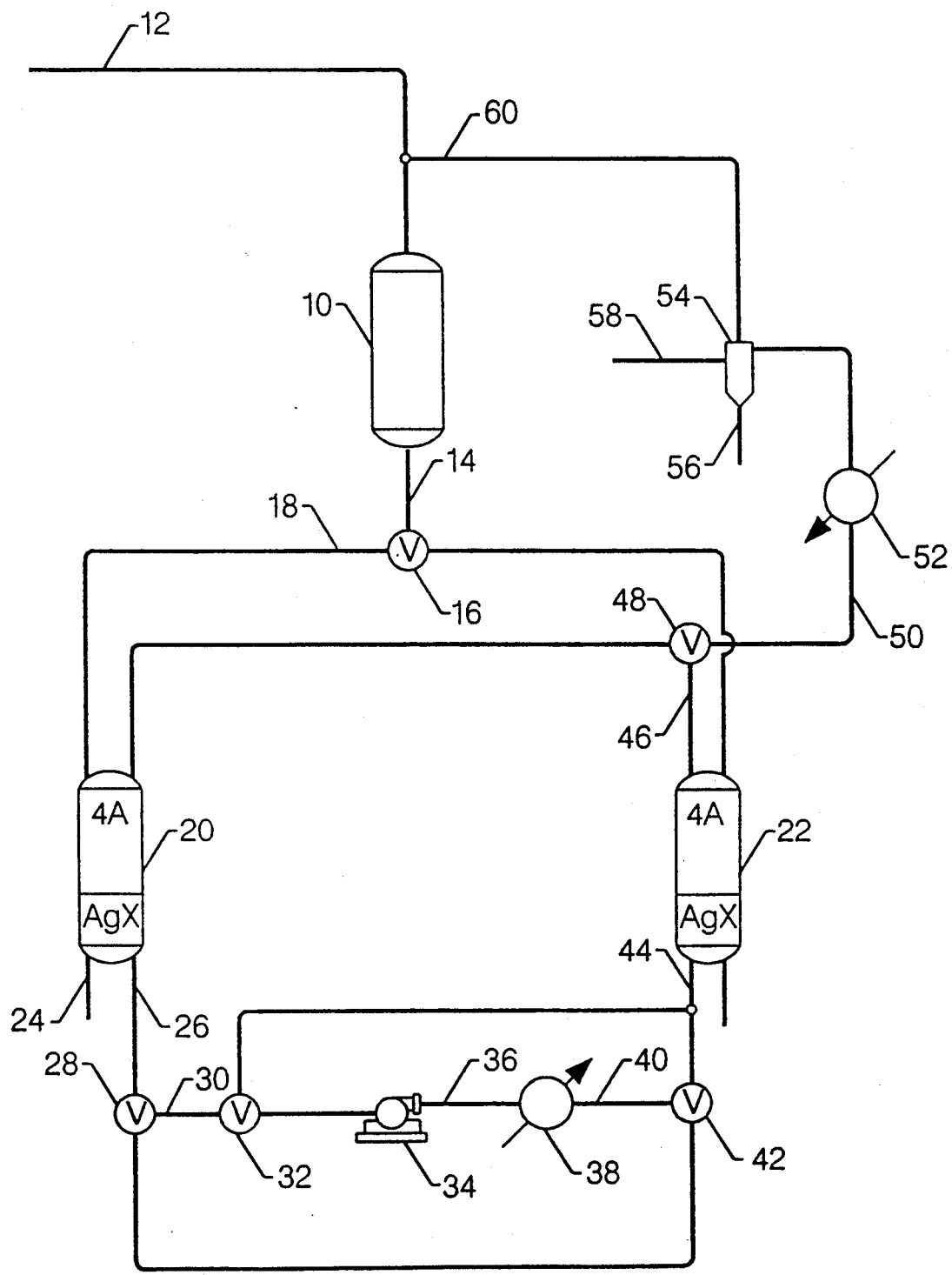

REMOVAL OF MERCURY FROM PROCESS STREAMS

FIELD OF THE INVENTION

The present invention relates in general to the purification of fluid streams and more particularly to the removal of mercury entrained in liquid streams or mercury vapor from gas streams, such as natural gas, by means of adsorbing the mercury using an integrated system of regenerated and non-regenerated fixed adsorbent beds. In the system the bulk of the mercury is removed from the feed stream by initial passage through the non-regenerated bed, the effluent from which is further treated by passage through a regenerated bed to obtain the desired degree of purity.

BACKGROUND OF THE INVENTION

Mercury is an undesirable constituent of a considerable number of fluid streams, and consequently a considerable number of methods have been devised to selectively remove the mercury. In the main the mercury impurity is in the form of elemental mercury, but in a few instances mercury compounds, including organic mercury compounds, are of concern. In the case of elemental mercury the purification processes are largely adsorption procedures, and in these the most common type of adsorbent is an activated carbon having supported thereon a mercury reactive material such as potassium triodide, sulfur, sulfuric acid, chlorine, silver, copper or various salts of silver or copper. Other supports for the mercury reactive materials include silicas, aluminas, silica-aluminas and zeolitic aluminosilicates. Ion-exchange resins, particularly the strongly basic anion-exchange types which have been reacted with a polysulfide, have also been reported. See U.S. Pat. No. 4,591,490 (Horton) in this latter regard. The disclosures of U.S. Pat. No. 4,500,327 (Nishino) and U.S. Pat. No. 4,196,173 (de Jong et al) are pertinent to the use of activated carbon supports.

Perhaps the two greatest problems involved in removing mercury from fluid streams are (a) achieving a sufficient reduction in the mercury concentration of the feed stream being treated, and (b) avoiding the reentry of the recovered mercury into some other environmental medium. Although permissible levels of mercury impurity vary considerably, depending upon the ultimate intended use of the purified product, for purified natural gas, mercury concentrations greater than about 0.01 microgram per normal cubic meter ($\mu g/nm^3$) is considered undesirable, particularly in those instances in which the natural gas is to be liquefied by cryogenic processing. In the cases where mercury is removed from process streams by use of non-regenerable adsorbents, very large adsorption beds are required. This is because sufficient adsorbent must be present not only for the long term equilibrium capacity, but also enough adsorbent to contain the mass transfer (reaction) zone. In the case where the mercury removal is done by regenerative means, less adsorbent is required since only the adsorbent for containing the mass transfer zone is required. If regenerable, the regeneration media requirements are not only large but result in a large mercury-laden bed effluent which must itself be disposed of in an environmentally safe manner. A means has now been devised to combine the favorable aspects of both regenerable and non-regenerable process systems. Such a combination allows for (a) attaining the lowest possible mercury levels in the process streams, (b) making full utilization of the non-regenerative mercury removal adsorbent, and (c) disposing of the mercury in an environmentally safe manner.

THE DRAWINGS

The sole figure of the drawings is a schematic flow diagram showing one embodiment of the process system used in the practice of this invention.

SUMMARY OF THE INVENTION

In accordance with the present invention the process comprises: (a) providing a fluid stream containing at least 0.02, and preferably at least 2.0, $\mu g/nm^3$ of elemental mercury; (b) passing said stream into a first and non-regenerable fixed adsorption bed containing an adsorbent on which said mercury is preferentially adsorbed whereby mercury is adsorbed and a mercury-depleted fluid stream is recovered as the effluent therefrom; (c) passing said effluent into a second and regenerable fixed adsorption bed containing an adsorbent for mercury whereby a mercury mass transfer front is established and a product effluent further depleted in mercury is recovered; (d) terminating the flow into said second adsorption bed prior to breakthrough of the mercury mass transfer front; (e) regenerating said second fixed bed by passing therethrough, preferably in a direction countercurrent to the direction of flow therethrough during step (c), a purge desorbent having essentially the same chemical composition as the effluent from said second bed during step (c) whereby mercury is desorbed and removed from said bed in the effluent; and (f) combining the effluent from said second fixed bed with the fluid stream provided in step (a).

DETAILED DESCRIPTION OF THE INVENTION

In carrying out the present process the adsorption system employed comprises a principal non-regenerable fixed adsorption bed and a secondary regenerable fixed adsorption bed. As used herein the term non-regenerable as applied to the principal bed is not used in the absolute sense to mean that regeneration of the adsorbent is impossible but rather that regeneration, if in fact feasible, is not cyclically carried out as an integral part of the process scheme. The function of the non-regenerable bed is to provide a long-term equilibrium capacity for adsorbed mercury. Since, however, it is necessary to remove the mercury content of the feed stream being treated to very low levels, it is found that following a relatively brief period of use after installation of fresh adsorbent in the bed, the bed effluent contains more than tolerable concentrations of mercury even though the bed retains a very large capacity to adsorb additional mercury. This circumstance is remedied in the present process by the use of a secondary regenerable adsorption bed which treats the effluent from the principal bed on a short-term basis, i.e., is employed to treat that effluent only for the period in which the effluent from the secondary bed contains tolerable concentrations of mercury. Thereafter the secondary bed is regenerated and the desorbed mercury is recycled through the principal bed thereby increasing the efficiency of the principal bed as a mercury absorber.

Accordingly the adsorbent contained in the principal bed is advantageously one which is relatively inexpensive yet has a capacity to accumulate a high loading of adsorbed mercury when contacted with fluid streams containing concentrations of mercury significantly higher than the feed stream introduced initially into the adsorption system. A preferred adsorbent for the principal bed is selected from the various activated carbon-supported compositions, particularly those containing sulfur or sulfur compounds reactive with mercury, or the copper or sulfur loaded aluminosilicate zeolites such as zeolite X and zeolite Y in the alkali metal and alkaline earth metal cation forms. The $Hg^{++}$ cation forms of zeolites X and Y are reported by Barrer et al [J. Chem. Soc. (1967) pp. 19–25] to also exhibit very large capacities for mercury adsorption due to the chemisorption of metallic mercury at the $Hg^{++}$ cation sites to form $Hg_2^{++}$ cations initially and then to proceed further to create clusters of mercury within the zeolite in accordance with the proposed equation

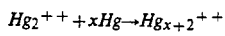

$$Hg_2^{++} + xHg \rightarrow Hg_{x+2}^{++}$$

Copper sulfide carried on an alumina support has also been reported to be a satisfactory adsorbent for the bulk removal of mercury from gas streams. The specific mention of these materials is not intended to be limitative, the composition actually selected being a matter deemed most advantageous by the practitioner given the particular circumstances to which the process is applied.

As alluded to hereinbefore, the function of the secondary bed in the process is two-fold, namely to remove additional mercury from the effluent stream from the principal bed so that a product stream of desired purity is obtained, and to concentrate mercury not initially retained by the principal bed into a regeneration gas stream so as to provide a feed stream to the principal bed richer in mercury content and thus maximize the loading of adsorbed mercury on the principal bed prior to that adsorbent's periodic removal from the system. The relative importance of the second of the aforenamed functions will depend upon the initial concentration of mercury in the external feed stream being treated and the shape of the mercury adsorption isotherm of the adsorbent at the process temperature. Accordingly the adsorbent in the secondary bed is preferably chosen on the basis of the degree to which it can adsorb mercury from feedstreams relatively low in mercury concentrations. Since, moreover, the secondary bed is to be repeatedly regenerated in situ in the system, the initial cost of the adsorbent is less of a factor in its selection. An especially effective adsorbent for this purpose is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. More specifically the adsorbent is formed of particles comprised of crystallites of a zeolitic molecular sieve having pore diameters of at least 3.0 Angstroms and in which the said zeolite crystallites forming the outer shell of the adsorbent particles to a depth of not greater than about 0.1 millimeter into the particles and constituting less than about 35 volume percent of said particles, contain ionic or elemental silver. The remainder of the overall adsorbent particles are preferably free of silver since this additional silver does not adsorb mercury as efficiently as the more exposed outer surface silver, and thus adds unduly to the cost of the adsorbent. Zeolite A containing elemental gold is disclosed as an adsorbent for mercury in the later issued U.S. Pat. No. 4,892,567 (Yan).

The mercury-containing fluid stream suitably treated by the present process can be either in the liquid or the vapor state. The constituents other than mercury are not critical except in those cases in which such constituents seriously attack the particular adsorbents involved in the process and render same incapable of functioning to selectively adsorb and retain mercury. Suitable streams include natural gas streams, which typically contain as high as 22 parts per billion (vol.) mercury vapor, but can contain much higher concentrations of mercury, along with carbon dioxide, water vapor, hydrogen and higher hydrocarbons as impurities, by-product hydrogen streams from the commercial production of chlorine by the electrolysis of sodium chloride using a mercury-containing electrode, helium and other inert gases, furnace stack gases, battery disposal incinerator gases, air, hydrocarbons such as ethylene (cracked gas), light and heavy naphtha fractions, liquefied petroleum gas, dripolene and the like. The feedstocks are suitably processed by the present process in the temperature range of 0° C. to 65° C. and using pressures of from atmospheric to 2500 psia.

In carrying out the present process it will be understood that for continuous operation over an appreciable period it is necessary that there be at least two trim beds capable of receiving partially purified effluent from a principal bed in order that one trim bed can be regenerated while another is engaged in purifying principal bed effluent. While highly desirable, continuous operation is not, however, essential in the practice of the present invention.

A typical process embodiment of the present invention is illustrated with reference to the flow diagram of the drawings. Principal bed 10 contains 49,000 pounds of ⅛" extruded zeolite X pellets loaded with 6 weight percent elemental sulfur. Natural gas, from which $CO_2$ has optionally been removed, saturated with water vapor and containing 14 parts per billion [ppb (v)] mercury vapor is passed into bed 10 through line 12 at a superficial velocity of 35.3 feet per minute and at a temperature of 21° C. The bulk of the mercury is adsorbed on the sulfur-loaded adsorbent and an effluent stream containing 0.35 ppb mercury passes through line 14, valve 16 and line 18 into secondary bed 20. Secondary beds 20 and 22 are compound beds having a discrete upper zone of a conventional desiccant, zeolite 4A, and a lower mercury-adsorbing zone of a silver-loaded zeolite 13X. Each secondary bed contains in the lower zone 3,985 pounds of ⅛" extruded zeolite X pellets having 13.6 weight percent silver as zeolitic cations, 95 percent of which are located within 0.1 millimeter of the external surface of the pellets. The upper desiccant zone contains 20,515 pounds of zeolite 4A. The natural gas effluent from bed 20 is substantially water-free and contains less than 10 parts per trillion (v) of mercury and the major portion is recovered as purified product through line 24. The remainder of the effluent from bed 20 is passed through line 26, valve 28, line 30, valve 32, compressor 34, line 36, heater 38, line 40, valve 42, and line 44 into the bottom of bed 22. Bed 22 has previously been in service in the same adsorption-purification mode as bed 20 is presently involved and contains about 0.47 pounds of adsorbed mercury. The purge desorption stream of purified natural gas entering the bottom of bed 22 has been heated in heater 38 to a temperature of about 290° C. In passing through bed 22, the purge gas desorbs mercury and the effluent stream leaving bed 22 through line 46 contains, on average, about 9.4 ppm mercury vapor and is saturated with water vapor. This stream passes through valve 48 and line 50 to chiller 52 and knock-out 54 wherein condensed liquid mercury is removed from the system through line 56 and water is removed through line 58. The effluent vapor from knock-out 54 is passed through line 60 to join the natural gas feed stream being fed to adsorbent bed 10. Operation is continued in this manner until the capability of bed 10 to effectively adsorb mercury is reached. Thereafter the adsorbent charge in bed 10 is replaced with fresh adsorbent and the process continued.

In view of the foregoing a number of obvious modifications within the proper scope of the invention will be apparent to those of skill in the art. For example, where leakage of mercury from the non-regenerated bed is relatively low resulting in relatively low adsorbed mercury loadings in the regenerated beds, it can be the case that no liquid mercury is recovered from the knock-out apparatus before the regeneration stream is recycled to the non-regenerated bed. It may also be the case that the feedstock being treated is substantially free of water vapor. In that event the knock-out apparatus is unnecessary, although means to reduce the temperature of the regeneration gas before it enters the non-regenerated bed is highly desirable.

The same process scheme as illustrated in the drawing is also suitable for recovering mercury from hydrocarbon streams such as naphtha. The feedstock is advantageously treated in the liquid phase in such a process and instead of regenerable compound beds, beds containing only adsorbents for mercury removal are employed. Regeneration of the regenerable beds can be in the vapor phase using a vaporized portion of the purified product.

What is claimed is:

1. Process for the removal of mercury from a fluid stream which comprises:
    (a) providing a fluid stream containing at least 0.02 $\mu g/nm^3$ of elemental mercury;
    (b) passing said stream into a principal non-regenerable first fixed adsorption bed containing adsorbent on which said mercury is preferentially adsorbed whereby mercury is adsorbed and a mercury-depleted fluid stream is recovered as the effluent therefrom;
    (c) passing said effluent into a secondary regenerable fixed adsorption bed containing an adsorbent for mercury whereby a mercury mass transfer front is established and a product effluent further depleted in mercury is recovered;
    (d) terminating the flow into said second adsorption bed prior to breakthrough of the mercury mass transfer front; and
    (e) regenerating said secondary fixed bed by passing thereunto a purge desorbent stream having essentially the same chemical composition as the effluent from said second bed during step (c) whereby mercury is desorbed and removed from said bed in the effluent; and,
    (f) combining the effluent in step (e) with the fluid stream provided in step (a).

2. Process according to claim 1 wherein the effluent in step (e) is passed through means to condense and recover a portion of the mercury content thereof before the remainder of the said effluent is treated in step (f).

3. Process according to claim 1 wherein in step (e) the second fixed bed is regenerated by the purge desorbent stream passing therethrough in a direction countercurrent to the direction of flow therethrough in step (c).

4. Process according to claim 1 wherein the fluid stream being treated for mercury removal is natural gas.

5. Process according to claim 1 wherein the fluid stream being treated for mercury removal is liquid naphtha.

6. Process according to claim 1 wherein the adsorbent in the secondary fixed bed comprises particles containing at least one metal selected from the group consisting of silver, gold, platinum and palladium.

7. Process according to claim 6 wherein the adsorbent particles in the secondary fixed bed comprise crystallites of a zeolitic molecular sieve having pore diameters of at least 3.0 Angstroms and in which the said zeolite crystallites forming the outer shell of the adsorbent particles to a depth of not greater than about 0.1 millimeter into the particles and constituting less than about 35 volume percent of said particles contain ionic or elemental silver.

8. Process according to claim 6 wherein the adsorbent in the principal non-regenerable adsorption bed comprises an activated carbon containing sulfur or a sulfur compound.

9. Process according to claim 7 wherein the zeolitic molecular sieve having pore diameters of at least 3.0 Angstroms is zeolite A or a zeolite having the faujasite crystal structure.

10. Process according to claim 1 wherein the adsorbent in the principal non-regenerable adsorption bed comprises particles of alumina containing copper sulfide.

11. Process according to claim 1 wherein the regenerable secondary fixed adsorption bed is a compound bed containing a desiccant and an adsorbent reactive with mercury.

* * * * *